United States Patent [19]

Wakui

[11] Patent Number: 5,013,987
[45] Date of Patent: May 7, 1991

[54] CONTROL SYSTEM FOR MAGNETIC BEARING

[75] Inventor: Shinji Wakui, Tokyo, Japan

[73] Assignee: Seiko Instruments Inc., Japan

[21] Appl. No.: 381,506

[22] Filed: Jul. 18, 1989

[51] Int. Cl.$^5$ .......................... G05B 5/01; F16C 39/06
[52] U.S. Cl. ..................................... 318/632; 318/621; 318/625; 310/90.5; 324/207.12
[58] Field of Search ................... 310/90.5; 318/568.21, 318/567, 605, 460, 607, 625, 629, 632, 651, 560; 324/207, 208, 232; 340/870.37

[56] References Cited

U.S. PATENT DOCUMENTS

| | | | |
|---|---|---|---|
| 3,702,208 | 11/1972 | Habermann et al. | 310/90.5 |
| 4,128,795 | 12/1978 | Habermann et al. | 318/605 X |
| 4,392,693 | 7/1983 | Habermann et al. | 310/90.5 |
| 4,567,435 | 1/1986 | Yamada et al. | 324/207 |
| 4,596,953 | 6/1986 | Nagasaka et al. | 324/207 X |
| 4,626,754 | 12/1986 | Habermann et al. | 318/605 X |
| 4,642,500 | 2/1987 | Higuchi et al. | 310/90.5 |
| 4,686,404 | 8/1987 | Nakazeki et al. | 310/90.5 |
| 4,697,128 | 9/1987 | Matsushita et al. | 318/625 X |
| 4,714,988 | 12/1987 | Hiroi et al. | 318/632 X |
| 4,763,032 | 8/1988 | Bramm et al. | 310/90.5 |
| 4,795,927 | 1/1989 | Morii et al. | 310/90.5 |
| 4,839,550 | 6/1989 | Mizuno et al. | 310/90.5 |
| 4,841,184 | 6/1989 | Chen et al. | 310/90.5 |
| 4,841,212 | 6/1989 | Matsushita et al. | 318/632 X |
| 4,940,924 | 7/1990 | Mizuno et al. | 318/621 X |

FOREIGN PATENT DOCUMENTS

| | | | |
|---|---|---|---|
| 0313727 | 5/1989 | European Pat. Off. | 310/90.5 |
| 0065415 | 4/1982 | Japan | 310/90.5 |
| 0065416 | 4/1982 | Japan | 310/90.5 |
| 0037322 | 2/1984 | Japan | 310/90.5 |
| 0201920 | 4/1986 | Japan | 310/90.5 |
| 0055031 | 3/1989 | Japan | 310/90.5 |

OTHER PUBLICATIONS

Trans. of Japan Society of Mechanical Engineers, Nov. 1967, vol. 33, No. 255, "Research of Control System For Magnetic Bearing of the Thrust Type", H. Shimizu et al., pp. 1753–1759.

*Primary Examiner*—Paul Ip
*Attorney, Agent, or Firm*—Bruce L. Adams; Van C. Wilks

[57] ABSTRACT

A control device for controlling displacement of a magnetically supported moving member according to a command. A feedback circuit detects the displacement of the moving member to servo-control the same to thereby ensure stability and robustness of magnetic supporting. A feedforward circuit has an input terminal receptive of a command and an output terminal connected to the feedback circuit, and cooperates with the feedback circuit while not disturbing the stability and robustness of the magnetic suppporting for controlling the displacement of the moving member according to the command.

8 Claims, 7 Drawing Sheets

CONTROL SYSTEM FOR MAGNETIC BEARING

BACKGROUND OF THE INVENTION

The present invention relates to a control system for a magnetic bearing which utilizes magnetic attractive force of an electromagnet, and operates to support a moving member at high speed with high accuracy while magnetically positioning the moving member.

The magnetic bearing utilizing magnetically attractive force of an electromagnet is classified as an unstable system in view of control theory. Namely, it has a pole on the real axis of the right half area of the complex coordinate system. This unstability can be well understood according the following physical phenomenon occurring in the magnetic bearing. If a closed loop control device were not provided for the magnetic bearing, the electromagnet would fix the moving member under excessive magnetically attractive force or it would release away the moving member under too weak an attractive force.

Consequently, a compensator is needed to stabilize the magnetic bearing. The compensator can operate to stabilize the entire system of the magnetic bearing structure and to satisfy robustness thereof. However, a complicated adjusting work is needed to satisfy both of the stability of magnetic supporting and the robustness, i.e., performance to suppress disturbance with sufficient allowance. Under such circumstance, it would be quite difficult to add command control to displace or position the moving member in response to a command input.

The above mentioned situation can be theoretically explained as follows. With reference to Report of Japanese Mechanic Society, "Research of control system for a magnetic bearing of the thrust type", Vol. 255, 1967, provided that gravity m is applied to a magnetically supported member and electromagnetic attractive force F is applied to the member in the opposite direction, the kinetic equation for the supported member in the direction of Z is represented as follows:

$$m \frac{d^2z}{dt^2} = mg - F(Z, I) \tag{1}$$

Since $mg = F(Z_0, I_0)$ is established in an equilibrium point, the relation (1) is expanded in terms of small displacements z and i as follows:

$$\frac{m}{g} \cdot \frac{d^2(Z_0 + z)}{dt^2} = -\left(\frac{\partial F}{\partial Z} z + \frac{\partial F}{\partial I} i\right) \tag{2}$$

$$\frac{1}{\beta} \cdot \frac{d^2 z}{dt^2} - z = -k_m i$$

where
$\beta = 2 g/Z_0$, $K_m = Z_0/2 (I_0 + I_A)$,
$F = K_F(I + I_A)/Z^2$ and $I_A$: remanence compensation.

When the state variable is represented by $x = [Z, \dot{Z}]^T$, the state equation is represented as follow:

$$\left. \begin{array}{l} x = Ax + bi, \quad y = cx \\ A = \begin{pmatrix} 0, 1 \\ \beta, 0 \end{pmatrix}, \quad b = \begin{pmatrix} 0 \\ \beta k_m \end{pmatrix}, \quad C = (1, 0) \end{array} \right\} \tag{3}$$

Consequently, the transfer function P(s) of the control object is represented as follow:

$$P(s) = c(sI_2 - A)^{-1} b = \frac{\beta k_m}{s^2 - \beta} \tag{4}$$

It is understood from the transfer function (4) that the magnetic bearing is an unstable system having a pole at $s = \sqrt{\beta}$ on the real axis of the right half of the complex coordinate plane.

Next, FIG. 2 shows the conventional closed loop control device for the magnetic bearing. Displacement of the supported member is detected by a displacement detector 1. A detection signal therefrom is fed to an integral compensator 2 for improving the standing performance. Then, a phase advancing compensator 3 carries out processing of the signal in order to hold the pole $s = \sqrt{\beta}$ of the unstable control object to a stable side. Lastly, an electric power amplifier 4 is driven to magnetically activate an electromagnet so as to control the control object 15 such that the controller supported object is held in a gap space in place.

Sensitivity S(s) and complementary sensitivity T(s) are introduced to indicate performance characteristics of the closed loop system as follows:

$$\left. \begin{array}{l} S(s) = (1 + P(s) C(s))^{-1} \\ T(s) = 1 - S(s) \\ C(s): \text{ transfer function of the entire} \\ \text{of compensator} \end{array} \right\} \tag{5}$$

The relation (5) is known to indicate the stability and the robustness. FIG. 3 shows one example of the performance characteristics. In order to balance between the stability and the robustness, it is desired to adjust a crossover frequency without changing forms of $S(j\omega)$ and $T(j\omega)$. However, as is apparent from close evaluation of the relation (5), there is no parameter of the compensator effective to adjust only the crossover frequency. Adjustment of any compensator parameter would cause change of the forms of $S(j\omega)$ and $T(j\omega)$ as well as the crossover frequency therebetween. Stated otherwise, in order to balance between the stability and the robustness, various parameters of the compensator must be adjusted concurrently. Under such a situation, it is quite difficult to establish a certain level of responsiveness to a command input to displace the supported member according to the command input.

In the prior art, a considerable amount of time is needed to balance between the stability and the robustness in the entire system due to its complicated work. Therefore, although the conventional system can establish a magnetic bearing condition stably in actual running if it has the drawback that the responsiveness to command which can not be realized to a certain level at the same time.

SUMMARY OF THE INVENTION

In order to remove the above noted drawback, an object of the present invention is to add, to the conventional closed loop control device which is proven stable and reliable through the actual running experience, a feedforward compensator effective to newly provide the responsiveness to command to thereby control the displacement of the magnetically supported member according to command.

According to the present invention, a feedforward compensator is added to impart desired responsiveness to command. Therefore, while the stable and robust conditions of magnetic bearing is maintained through the conventional feedback control, the displacement of a supported member can be efficiently controlled according to a command input. Namely, the added feedforward compensator functions as a signal supply operative to convert a frequency response characteristic of the conventional control device which undergoes roll-off at a relatively low frequency into a desired frequency response characteristic.

DESCRIPTION OF PREFERRED EMBODIMENT

Figure 1:
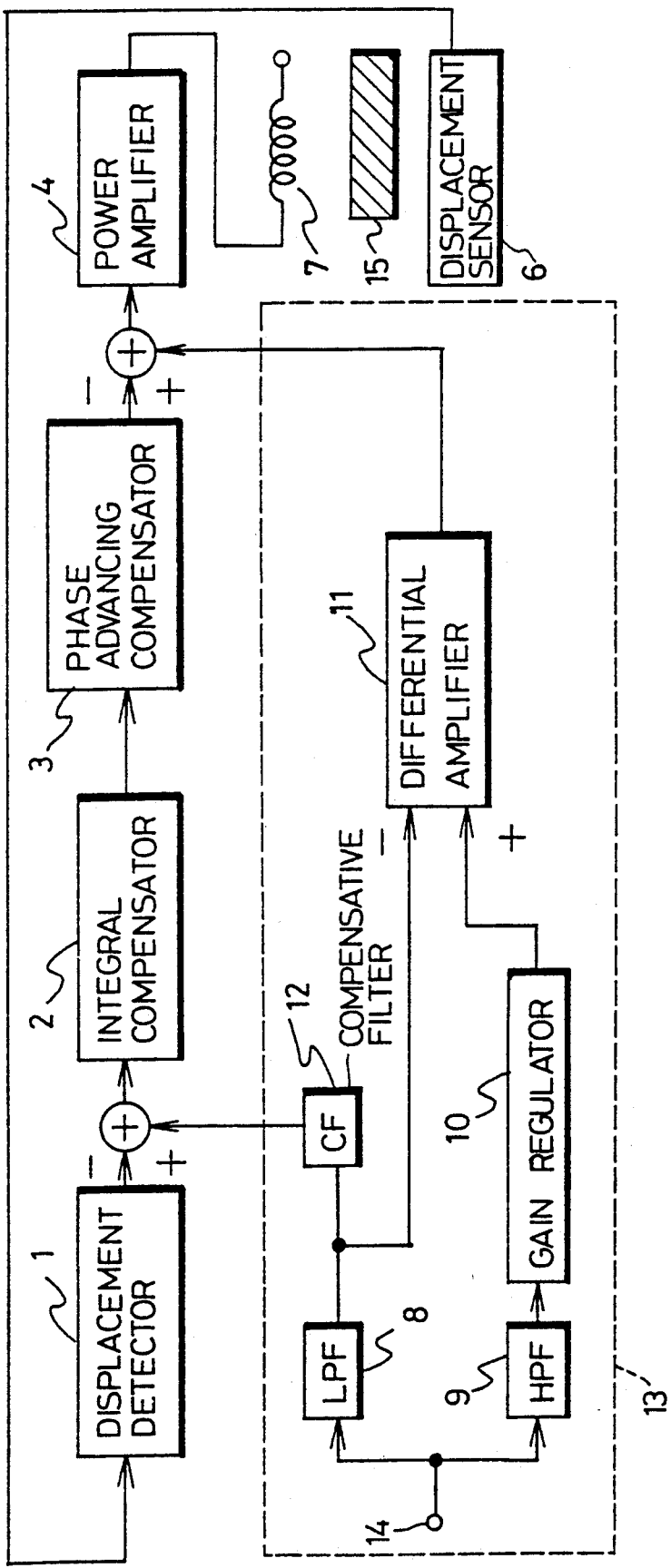
FIG. 1 is a block diagram showing a control device of a magnetic bearing according to the present invention.
Figure 2:
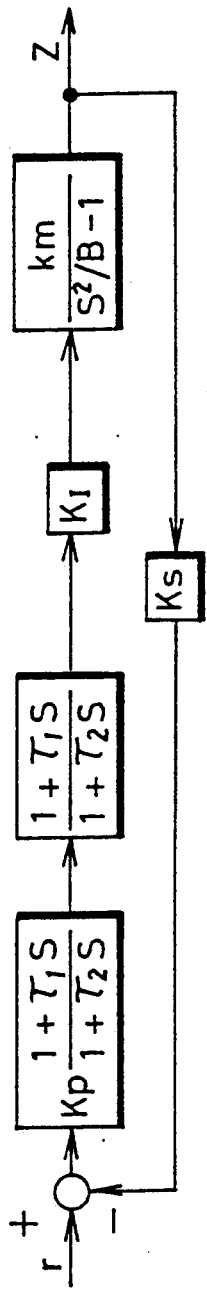
FIG. 2 is a block diagram showing the conventional control device of a magnetic bearing.
Figure 3:
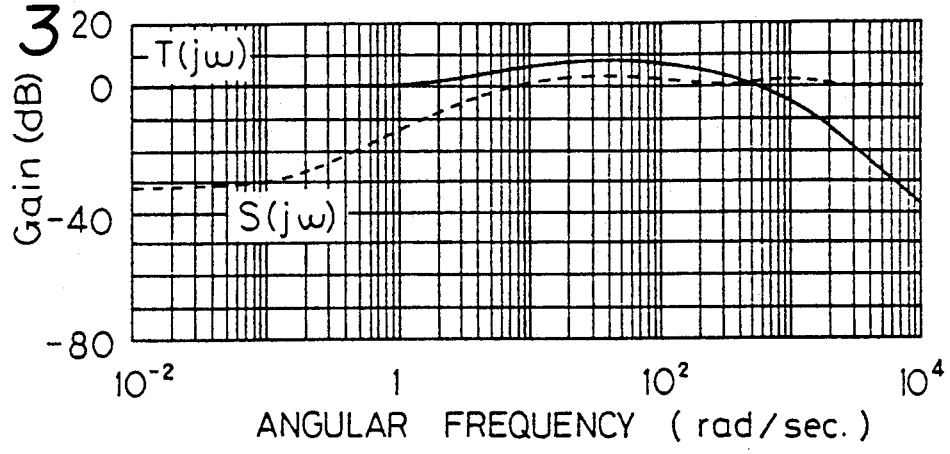
FIG. 3 is a diagram of S-T characteristic.

The present invention is described in detail in conjunction with the drawings hereinafter. FIG. 1 is a structual diagram of the control device of a magnetic bearing according to the invention. In the figure, the control device includes a closed loop comprised of a displacement sensor 6, a displacement detector 1, an integral compensator 2, a phase advancing compensator 3 and an electric power amplifier 4, effective to stabilize the magnetic bearing structure through servo control. To this closed loop is added a feedforward compensator 13 which is composed of various elements including a low-pass filter 8 (hereinafter, referred to as "LPF"), a high-pass filter 9 (hereinafter, referred to as "HPF"), a gain regulator 10, a differential amplifier 11 and a compensative filter 12 (hereinafter, referred to as "CF"). Transfer functions of the individual elements are appropriately set so as to obtain a desired frequency response characteristic from a command input terminal 14 to a displaceable supported member 15.

Further, addition of the feedforward compensator 13 does not break the stable supporting state of the magnetically supported member 15.

Hereinafter, transfer functions are indicated for the respective transfer elements which constitute the feedforward compensator 13. LPF 8 is given transfer function $G_{LPF}(s)$ which has an optimum frequency response characteristic desired by a designer as represented by:

$$G_{LPF}(s) = \frac{1}{(s/\omega_1)^2 + a_1(s/\omega_1) + 1} \quad (6)$$

where $\omega_1$ determines a band and $a_1$ determines a damping factor.

Transfer function $G_{HPF}(s)$ is given to the series connection of the HPF 9 and the gain regulator 10, as represented by:

$$G_{HPF}(s) = \frac{\frac{1}{\beta_n} \cdot s^2}{(s/\omega_1)^2 + a_1(s/\omega_1) + 1} \quad (7)$$

Namely, $G_{HPF}(s)$ has a denominator of quadratic polynomial having coefficients identical to those of the quadratic polynomial in the denominator of a $G_{LPF}(s)$ shown by the relation (6).

According to the relations (6) and (7), transfer function $G_{DIF}(s)$ is determined for the feedforward compensator 13 from the command input terminal 14 to the output terminal of the differential amplifier 11 as represented by:

$$G_{DIF}(s) = \frac{1}{k_{ln} k_{mn}} \cdot \frac{\frac{1}{\beta_n} \cdot s^2 - 1}{(s/\omega_1)^2 + a_1(s/\omega_1) + 1} \quad (8)$$

where $1/K_{1n}K_{mn}$ represents the gain of the differential amplifier 11.

CF12 functions to compensate distortion of the frequency response from the command value, caused by an error in modeling the control object. In this embodiment, the transfer function of CF12 is set to 1.

When the transfer functions are set as described above for the respective transfer elements of the feedforward compensator 13, if the following relations are satisfied as represented by:

$$\beta_n=\beta, K_{1n}=K_1, K_{mn}=K_m \quad (9)$$

the transfer function $G_{zh}(s)$ from the command input of the terminal 14(r) to the displacement of the supported member 15 is set as follow:

$$G_{zr}(s) = G_{LPF}(s) = \frac{1}{(s/\omega_1)^2 + a_1(s/\omega_1) + 1} \quad (10)$$

Namely, the transfer function $G_{zr}(S)$ can be set identical to the transfer function $G_{LPF}(S)$ which is given as the optimum characteristic according to the desired specification of the designer. In general, it would be quite difficult to establish provisionally such model matching condition at the time of circuit design.

Thus, when $\beta_n \neq \beta$, $K_{IN} \neq K_I$ and $K_{mn} \neq k_m$, the transfer function $G_{zr}(S)$ is represented as follow:

$$G_{zr}(s) = \frac{1}{(s/\omega_1)^2 + a_1(s/\omega_1) + 1} \cdot \frac{k_I k_m}{k_{in} k_{mn}} \times$$

$$\frac{(s^2/\beta_n - 1)(1 + \tau_2 s)(1 + T_2 s) + \frac{k_{in} k_{mn} k_{LOOP}}{k_I k_m}}{(s^2/\beta - 1)(1 + \tau_2 s)(1 + T_2 s) + k_{LOOP}(1 + \tau_1 s)(1 + T_1 s)}$$ (11)

where $K_{LOOP} = K_s K_p K_I K_m$. By adjusting $\beta_n$ to $\beta$, $K_{IN}$ to $K_I$ and $K_{mn}$ to $K_m$, the transfer function $G_{zr}(S)$ represented by the general relation (11) can be modified to that represented by the specific relation (10).

Figure 4:
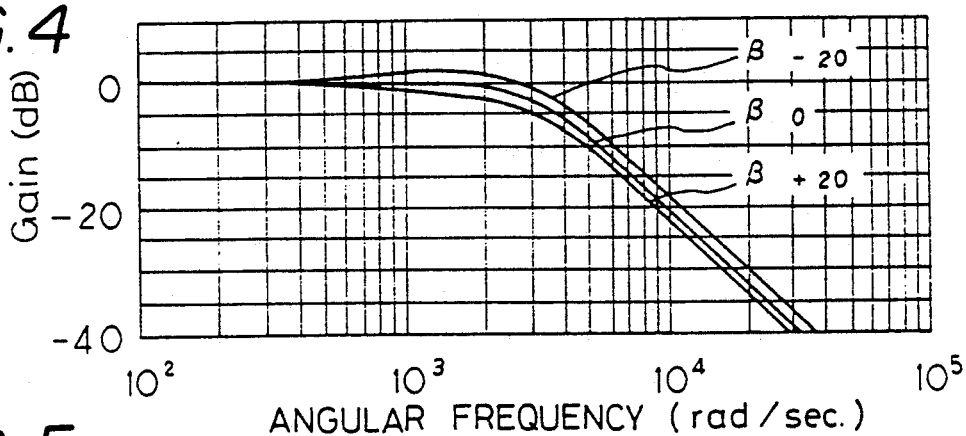
FIG. 4 is a diagram of frequency response with respect to a command when value $\beta$ has an error.
Figure 5:
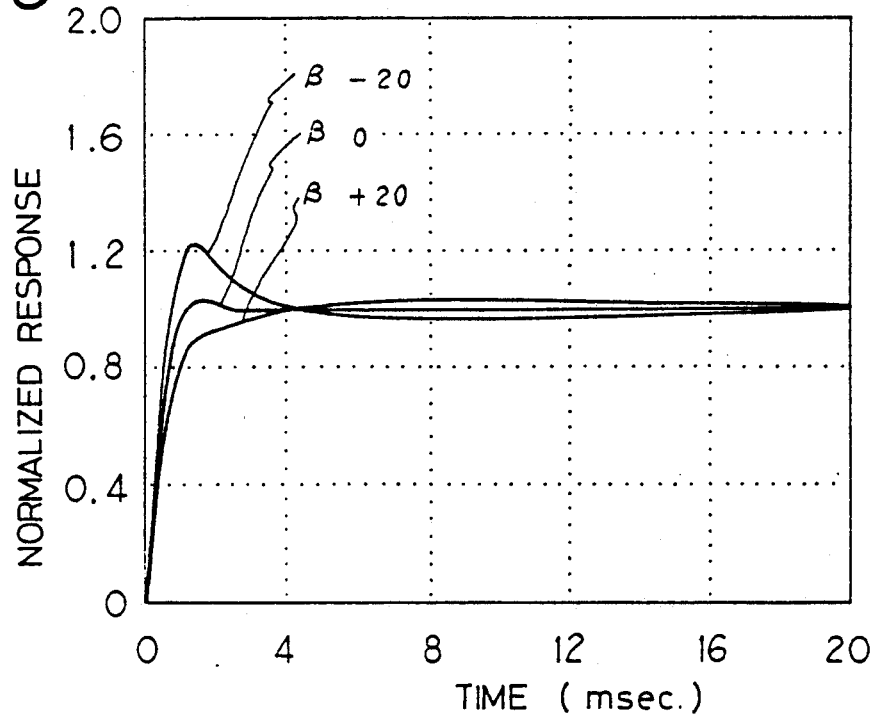
FIG. 5 is a diagram showing a time response waveform with respect to a step command when value $\beta$ has an error.

The parameter $1/K_{IN}K_{mn}$ relates to the gain of the differential amplifier 11 and therefore can be tuned without difficulty. Further, the parameter $1/\beta_n$ can be also tuned without difficulty by means of regulation of the gain regulator 10 connected subsequently to HPF9. Such adjusting or tuning operations are schematically illustrated by FIGS. 4 and 5. In the case of $K_{IN} = K_I$, $K_{mn} = K_m$ and $\beta_n = \beta$, frequency response is indicated by FIG. 4, and the response feature to step command is indicated by FIG. 5. In the figures, $\beta \pm 20$ indicates an amount of deviation of $\pm 20\%$ from the value $\beta_0$. Consequently, while monitoring the characteristic curves as indicated by FIGS. 4 and 5, the gain of the gain regulator 10 is tuned to converge the frequency response characteristic to that determined by the relation (6).

Figure 12:
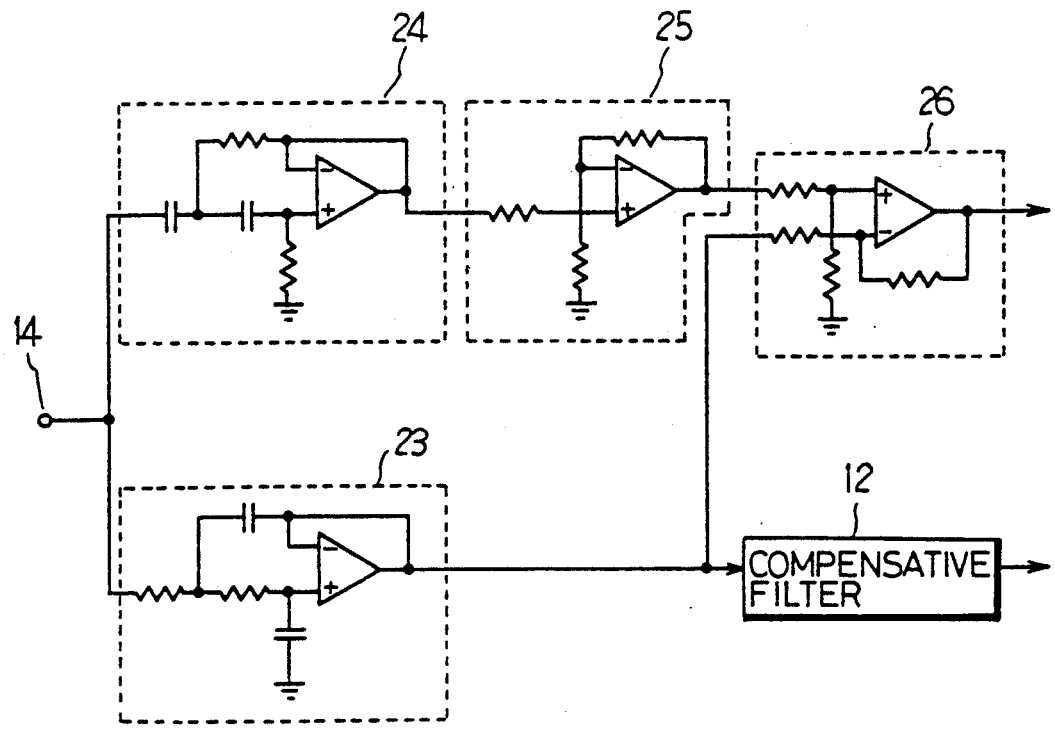
FIG. 12 is a circuit diagram showing one embodiment of the feedforward compensator according to the invention.

The respective elements constituting the feedforward compensator 13 have the transfer functions represented by the relations (6), (7) and (8). Specific circuit structure can be designed to realize these transfer functions in various manners. FIG. 12 is a circuit diagram of one embodiment of the feedforward compensator circuit according to the invention. In the figure, a circuit 23 constitutes the LPF8, circuit 24 constitutes the HPF9, a circuit 25 constitutes the gain controller 10 and a circuit 26 constitutes the differential amplifier 11. However, with regard to the CF12, its circuit structure can not be determined uniquely and therefore is indicated by a block, because the CF12 functions to finely adjust the distortion of the frequency response caused by deviation from the ideal model of control object indicated by the relation (4). By such circuit construction, the feedforward compensator 13 can be realized according to the present invention.

Figure 6:
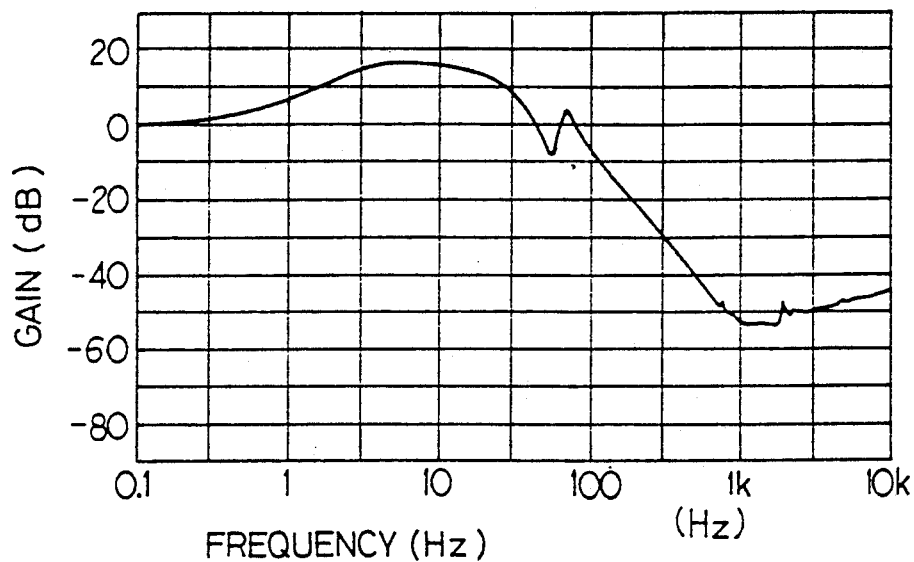
FIG. 6A is a diagram showing a measured result of frequency response with respect to a command in the prior art.
FIG. 6B is a diagram showing a measured result of frequency response with respect to a command according to the invention.
Figure 6:
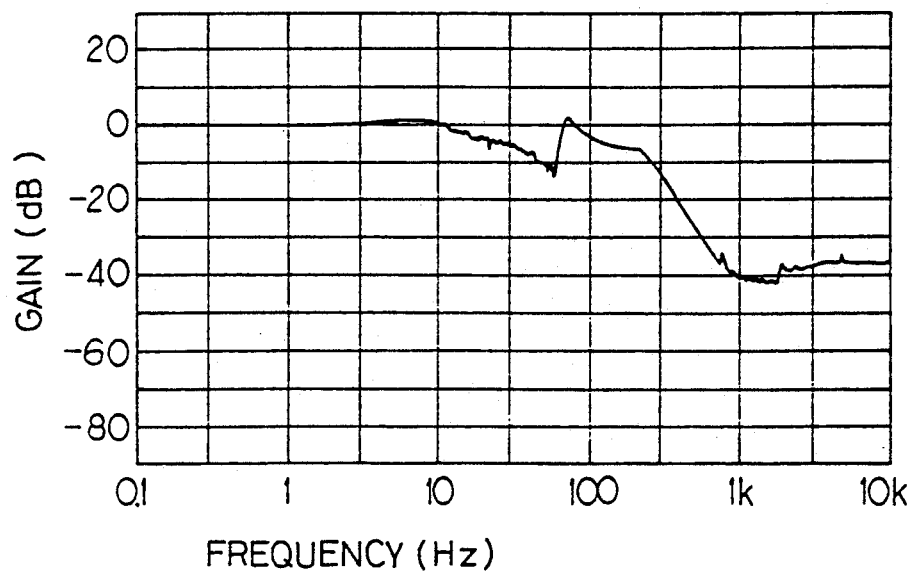

The operation of the inventive control device is explained in conjunction with various characteristic diagrams. In the following case, the control device is applied to a magnetic bearing structure which supports a moving member having 7.8 kg of weight with 300 μm of gap space at each side. FIG. 6A shows frequency response in the case of the conventional control device and FIG. 6B shows frequency response in the case of the inventive control device. As seen from FIG. 6B, the inventive device exhibits a flat characteristic having a broadened frequency band and is improved to respond well to the command input signal. FIGS. 6A and 6B show distortion of the frequency response (once dipped and then packed) around 80 Hz frequency, which is caused by mechanical resonance. Though the distortion of frequency response due to the mechanical resonance is not eliminated in the present embodiment, it can be expedient to introduce compensating function to remove this distortion by means of CF12.

Figure 7A:
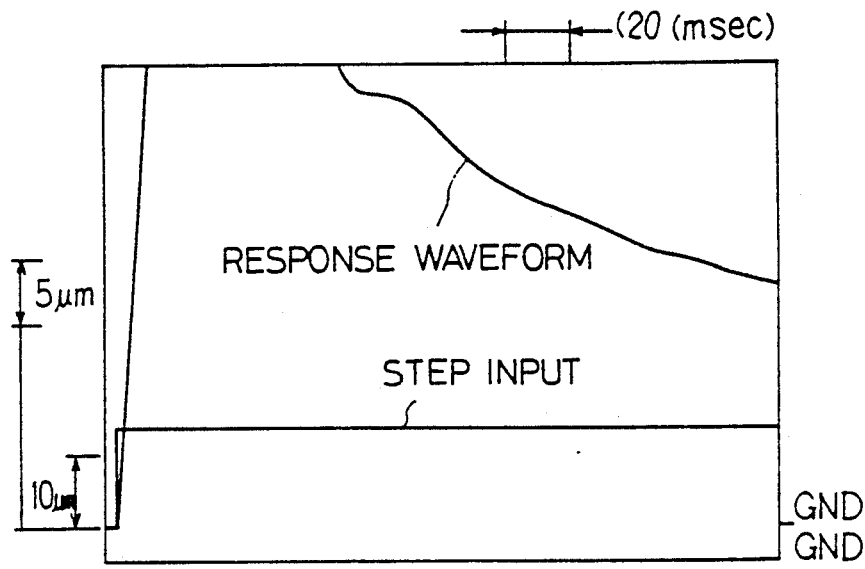
FIG. 7A is a diagram showing a measured result of response with respect to a step command input in the prior art.
Figure 7B:
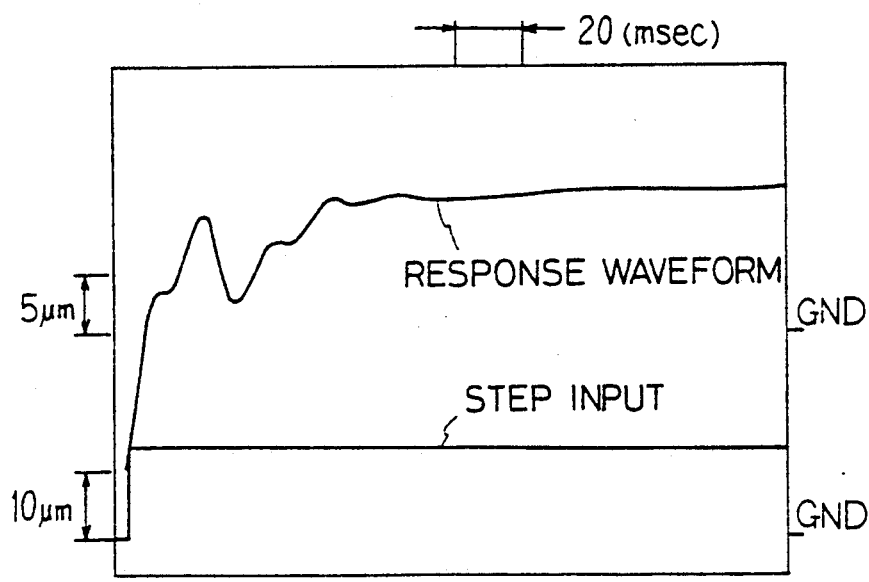
FIG. 7B is a diagram showing a measured result of response with respect to a step command input according to the invention.

FIGS. 7A and 7B show results of a response experiment to a step command input. FIG. 7A is of the conventional control device, and indicates the existence of remarkable overshoot and rather long time duration for stabilization. On the other hand, FIG. 7B is of the inventive control device, and indicates no overshoot and short time duration to reach a standing condition.

Figure 8:
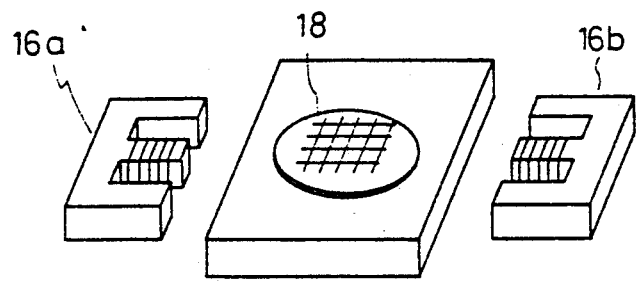
FIG. 8 is schematic perspective view showing a positioning table device applied with the invention.

The inventive merit can be better understood from the following industrial applications of the present invention. FIG. 8 is a first embodiment of application to a positioning table 17 supported and positioned magnetically by a pair of electromagnets 16a and 16b, on which IC wafer 18 is placed. Such type of the positioning table 17 is normally provided with a great gap space to obtain needed displacement. Accordingly, a highly rigid condition can not be easily established, while a low rigid condition is normally realized. In the latter case, the response of table displacement is slow to command input. However, by using the inventive control device, the positioning table 17 is displaced in place without overshoot at high speed in order to increase the operability thereof.

Figure 9:
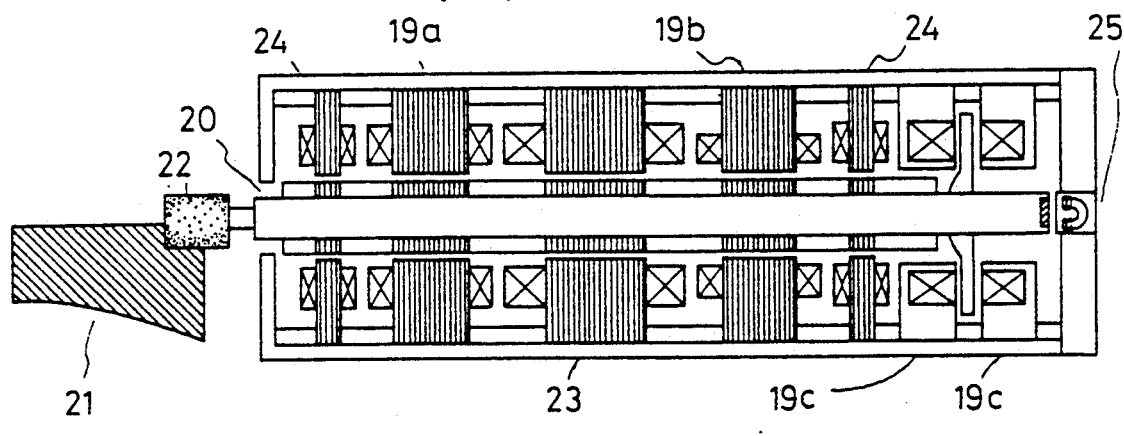
FIG. 9 is a schematic sectional view showing a spindle of a machine tool applied with the invention.

FIG. 9 shows a second application of the inventive device to a spindle of machine tool having motor 23, displacement sensors 24 and axial displacement sensor and, supported by electromagnets 19a and 19b, and axial electromagnet 19c. Such type of the machine tool spindle can be used for vibrating work. In this work, a sine wave signal is inputted as a displacement command so as to vibrate axially a magnetically supported rotational member 20 to thereby reduce working energy. Tarchan Company of U.S.A. has reported that by applying vibration having 0.05 to 13 mm of amplitude and 2 KHz of frequency to the rotational member 20 in the thrust direction thereof, the cutting energy is reduced up to 50%. As in this report, amplitude of the sine wave and vibrating frequency thereof are parameters to set the working condition. In the conventional control device having only closed loop frequency response, the command parameters can not be set freely due to the resonant characteristic of the closed loop system and roll-off feature at relatively low frequency. On the other hand, according to the present invention, a feedforward compensator is added to the conventional control device so as to establish the desired responsiveness to the command to thereby avoid the above mentioned drawback of the prior art. The above described situations are schematically illustrated by FIGS. 10, 11A, 11B, 11C and 11D.

Figure 10:
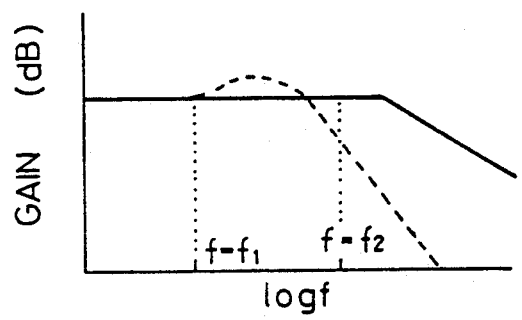
FIG. 10 is a diagram showing frequency response with respect to a command in the conventional and inventive control devices.
Figure 11:
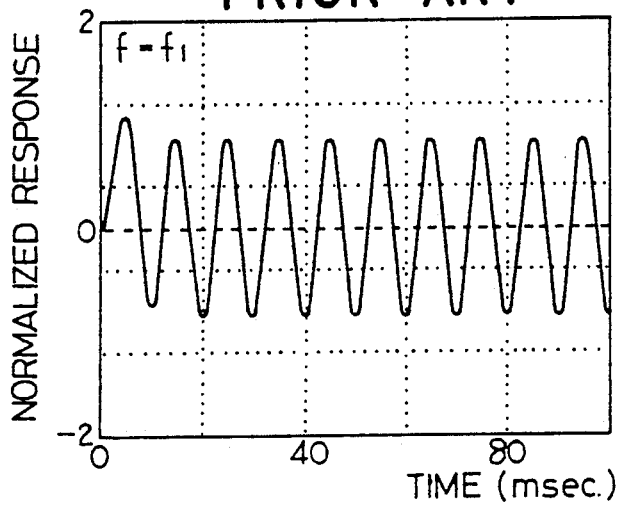
FIG. 11A is a diagram showing time response at $f=f_1$ of FIG. 10 in the conventional control device.
FIG. 11B is a diagram showing time response at $f=f_2$ of FIG. 10 in the conventional control device.
FIG. 11C is a diagram showing time response at $f=f_1$ of FIG. 10 in the invention control device.
FIG. 11D is a diagram showing time response at $f=f_2$ of FIG. 10 in the inventive control device.
Figure 11:
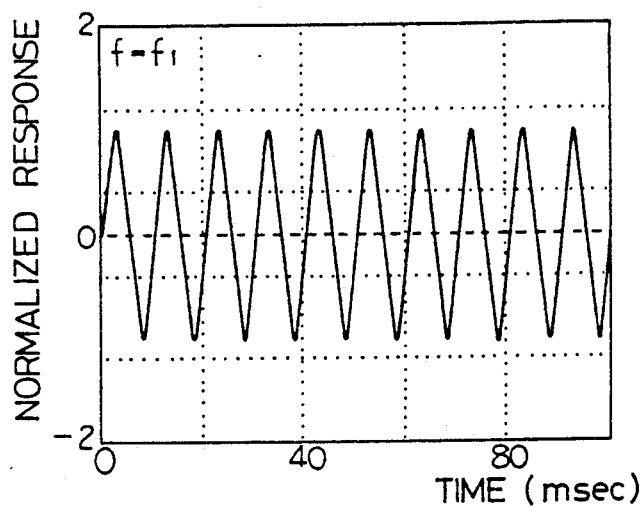
Figure 11:
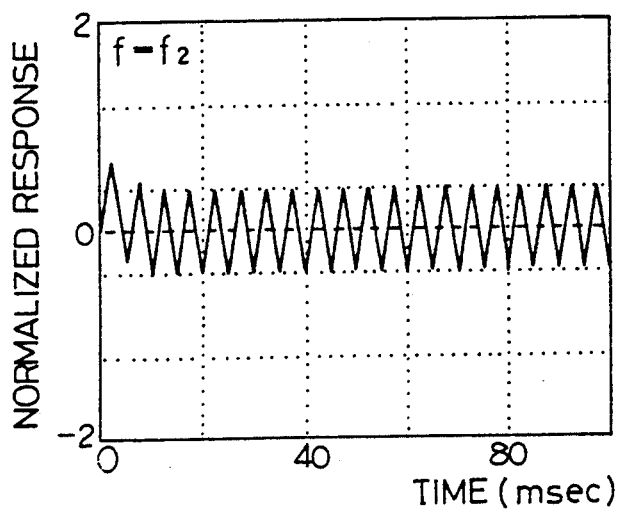
Figure 11D:
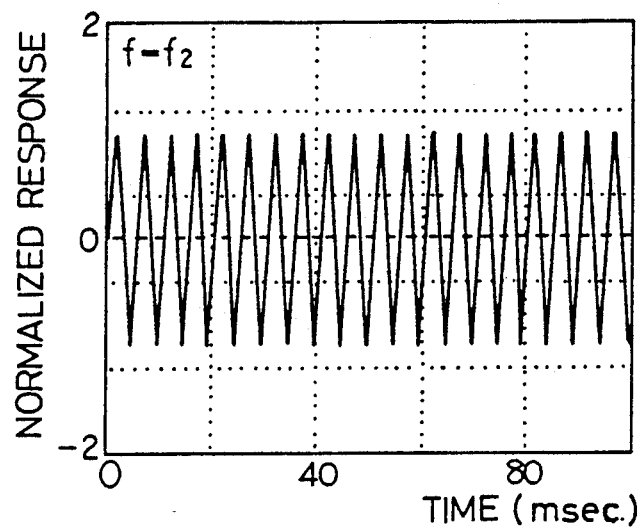

Referring to FIG. 10 showing a frequency response to a command, the dashed curve is of the conventional control device and the solid curve is of the inventive control device. FIGS. 11A and 11C show time response at frequency of $f = f_1$ for the conventional and inventive devices, respectively, indicating a good following feature to the input signal in both cases. However, FIGS. 11B and 11D show a time response at a frequency of $f = f_2$ for the conventional and inventive devices, respectively, indicating that the response amplitude is reduced in the conventional device. On the other hand, in the inventive control device, the good following feature is ensured to the input signal. Besides the above described vibrating work, by using the inventive control device, a tool 22 is driven at high speed with high accuracy to cut into a workpiece 21 so as to carry out microworking.

As described above, the present invention has the considerably industrial merit without hindering the reliability which is ensured by the conventional control device through actual running operation.

What is claimed is:

1. A control device for controlling displacement of a magnetically supported moving member according to a command, comprising:
   a feedback circuit for detecting the displacement of the moving member to control the moving member to ensure stability and robustness of the magnetic support in response to the detected displacement, the feedback circuit comprising a closed loop composed of a displacement detector receptive of an output from a displacement sensor, an integral compensator coupled to the displacement sensor, a phase advancing compensator coupled to the integral compensator, and an electrical power amplifier coupled to the phase advancing compensator for effecting the magnetic support; and
   a feedforward circuit having an input terminal receptive of a command and an output terminal connected to the feedback circuit, and cooperative with the feedback circuit without disturbing the stability and robustness of the magnetic support for controlling the displacement of the moving member according to the command.

2. A control device according to claim 1; wherein the feedforward circuit has an output terminal connected to an input port of the electric power amplifier.

3. A control device according to claim 1; wherein the feedforward circuit comprises a low-pass filter connected to the input terminal, a high-pass filter connected to the input terminal, a compensative filter for effecting compensation of an output of the low-pass filter, a gain regulator for regulating a gain of an output of the high-pass filter, and a differential amplifier for differentially processing the outputs from the low-pass and high-pass filters to each other.

4. A control device according to claim 3; wherein the low-pass filter has a transfer function including a polynomial denominator preset according to desired response characteristic to the command, and the high-pass filter has another transfer function including another polynomial denominator having coefficients identical to those of the polynomial denominator of the transfer function of the low-pass filter.

5. A control system for controlling displacement of a movable member supported by magnetic support means, comprising: feedback control means for stabilizing the movable member in response to a displacement thereof caused by an undesired disturbance, the feedback control means comprising means for sensing a displacement of the movable member and for producing an output signal representative thereof, and compensating means receptive of the output signal for applying a compensating signal to the magnetic support means to stabilize the movable member; and feedforward control means responsive to an input command for controlling the displacement of the movable member without disturbing the stability thereof, the feedforward control means comprising input means receptive of the input command for producing a displacement signal corresponding thereto, the input means comprising a low-pass filter and a high-pass filter each receptive of the input command, and output means for combining the displacement signal with at least one of the output signal and the compensating signal of the feedback control means for receipt by the compensating means and the magnetic support means, respectively, the output means comprising means for combining an output signal from the low-pass filter with the output signal form the sensing means and for combining the difference between an output signal from the high-pass filter and the output signal from the low-pass filter with the compensating signal.

6. The control system according to claim 5, wherein the feedback control means comprises a closed loop including the sensing means and the compensating means.

7. The control system according to claim 5; wherein the input means comprises a compensative filter for effecting compensation of an output of the low-pass filter, a gain regulator for regulating a gain of an output of the high-pass filter, and a differential amplifier for differentially processing the outputs from the low-pass and high-pass filter with respect to each other.

8. The control system according to claim 7; wherein the low-pass filter has a transfer function including a polynomial denominator preset according to a desired response characteristic to the input command, and the high-pass filter has another transfer function including another polynomial denominator having coefficients identical to those of the polynomial denominator of the transfer function of the low-pass filter.

* * * * *